United States Patent [19]

Inoue

[11] Patent Number: 5,008,846

[45] Date of Patent: Apr. 16, 1991

[54] POWER AND SIGNAL SUPPLY CONTROL DEVICE

[75] Inventor: Akifumi Inoue, Fussa, Japan

[73] Assignee: Kabushiki Kaisha Toshiba, Kawasaki, Japan

[21] Appl. No.: 441,757

[22] Filed: Nov. 27, 1989

[30] Foreign Application Priority Data

Nov. 30, 1988 [JP] Japan .............................. 63-302469

[51] Int. Cl.$^5$ .............................................. G06F 1/00
[52] U.S. Cl. ........................................ 364/707; 371/66
[58] Field of Search ................ 364/707; 307/38, 39, 307/85, 86; 340/636; 377/16; 371/66

[56] References Cited

U.S. PATENT DOCUMENTS

| | | | |
|---|---|---|---|
| 4,628,484 | 12/1986 | Hattorie | 365/52 |
| 4,667,289 | 5/1987 | Yoshida et al. | 364/707 X |
| 4,698,748 | 10/1987 | Juzswik et al. | 364/707 X |
| 4,747,041 | 5/1988 | Engel et al. | 364/707 X |
| 4,806,784 | 2/1989 | Goda | 307/125 |
| 4,903,211 | 2/1990 | Ando | 364/443 |

FOREIGN PATENT DOCUMENTS

| | | |
|---|---|---|
| 0083215 | 7/1983 | European Pat. Off. |
| 0265209 | 4/1988 | European Pat. Off. |
| 8912550 | 10/1990 | European Pat. Off. |

OTHER PUBLICATIONS

IBM Technical Disclosure Bulletin, vol. 29, No. 10, Mar. 1987, pp. 4273-4274.

Primary Examiner—Dale M. Shaw
Assistant Examiner—Tan V. Mai
Attorney, Agent, or Firm—Cushman, Darby & Cushman

[57] ABSTRACT

In a laptop computer normally equipped with a removable flat panel display and having the option of being equipped with an external display, the removal of the flat panel display is detected when it is removed, thereby disabling the supply of power, control signals and data to the display. The supply of power, control signals and data to the display is not started unless the removable display is connected to the main system and a reset signal is generated by a power switch of the system or a reset switch. When the display is being connected to the main system, therefore, the supply of power, control signals and data to the display is disabled without fail.

18 Claims, 4 Drawing Sheets

POWER AND SIGNAL SUPPLY CONTROL DEVICE

BACKGROUND OF THE INVENTION

1. Field of the Invention

The present invention relates to a computer system with a display and, more particularly, to a power and signal control device for a flat panel display used in a laptop personal computer or laptop word processor.

2. Description of the Related Art

In the field of personal computers, small, light and handy-to-carry laptop computers are replacing conventional desktop computers. This trend is true of word processors. The present laptop computers are normally equipped with flat panel display devices such as liquid crystal display devices (LCDs) or plasma display panels (PDPs). Furthermore, many of such laptop computers are connectable to external color cathode ray tubes (CRTs). This is because the flat panel displays are usually adapted to monochrome display and color CRTs are more easy to watch than the flat panel displays for applications adapted for color displays. Hence, a flat panel display and an external color CRT will not be used simultaneously.

When an external color CRT is used, a normally equipped flat panel display may be an encumbrance to an operator. In a computer system with a mechanism for detaching or disconnecting a flat panel display from the computer body, the flat panel display is detached in such a case. After that, the flat panel display may erroneously be attached to the computer body while the power supply is turned ON. The attachment of the flat panel display with power supply turned ON may cause malfunctions of the computer system due to rush current. Further, abnormal an voltage may be generated depending on the way of attachment of the flat panel display to the computer body, thus causing a breakdown of the system and flat display panel.

SUMMARY OF THE INVENTION

It is accordingly an object of the present invention to provide a device for controlling the supply of power and signals to a flat display panel used in a laptop computer system which avoids the occurrence of malfunction and breakdown of the system and flat panel display even when the flat panel display is attached or connected to the computer body with system power supply turned ON.

According to a first aspect of the present invention, there is provided a device for controlling the supply of power and signals from a main system comprising: a display which can be connected to and disconnected from the main system; a detecting section for detecting whether the display is connected to the main system or not; a supply instructing section responsive to the detecting section and a reset signal applied thereto for generating a instruction signal for instructing the supply of power and signals to the display; a power controlling section responsive to the instruction signal for controlling the supply of power to the display; and a signal controlling section responsive to the instruction signal for controlling the supply of the signals to the display.

According to a second aspect of the present invention a method of controlling the supply of power and signals to a first display used in a computer system which is equipped with the first display connectable to or disconnectable from a main system and can be further equipped with a second display comprising the steps of: detecting whether the said first display is connected to said main system or not; generating an instruction signal for instructing the supply of power and signals to the first display in response to an output generated by the detecting step and an input reset signal; controlling the supply of power to the first display in response to the instruction signal; and controlling the supply of signals to the first display in response to the instruction signal.

According to the present invention, as described above, the supply instructing section generates a supply instructing signal for instructing the supply of power and signals to the flat panel display in response to a system reset signal generated by turning power ON or a reset switch, and an output signal of the detecting section adapted to detect whether the flat panel display is connected to the main system or not. The power control section is responsive to the instruction signal to turn ON or OFF the supply of power to the flat panel display. The signal control section is responsive to the supply instruction signal to control the supply of control signals and data to the flat panel display by the use of gate circuits. When the removable flat panel display is removed, the remove is detected so as to disable the supply of power, control signals and data to the flat panel display. Hence the supply of power, control signals and data to the display is not initiated after the display has been connected to the main body of the computer system unless a reset signal is generated by a power switch of the system or the reset switch. That is, when the display is being connected to the main body, the supply of power, control signals and data to the display is disabled without fail.

Accordingly, even when the flat panel display is connected to the system in operation, the malfunctions of the system, the latch up of complementary-metal oxide semiconductors (C-MOS), and the destruction of the main system and the flat panel display will not occur because power, control signals and data are not applied to the flat panel display.

BRIEF DESCRIPTION OF THE DRAWINGS

These and other objects of the invention will become apparent in the following description of preferred embodiments taken in conjunction with the accompanying drawings in which.

DETAILED DESCRIPTION OF THE PREFERRED EMBODIMENTS

Figure 1:
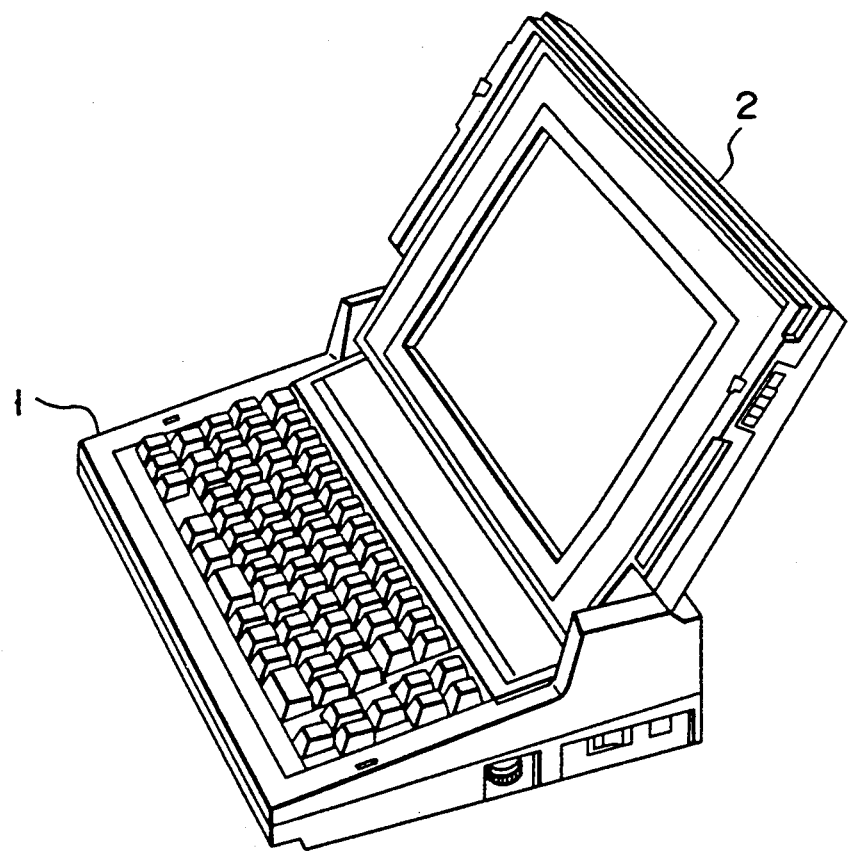
FIG. 1 is a perspective view of a laptop computer system to which the present invention is applied.

Referring to FIG. 1, reference numeral 1 designates the main system of a laptop computer system to which the present invention is applied and 2 designates a flat panel display.

Figure 2:
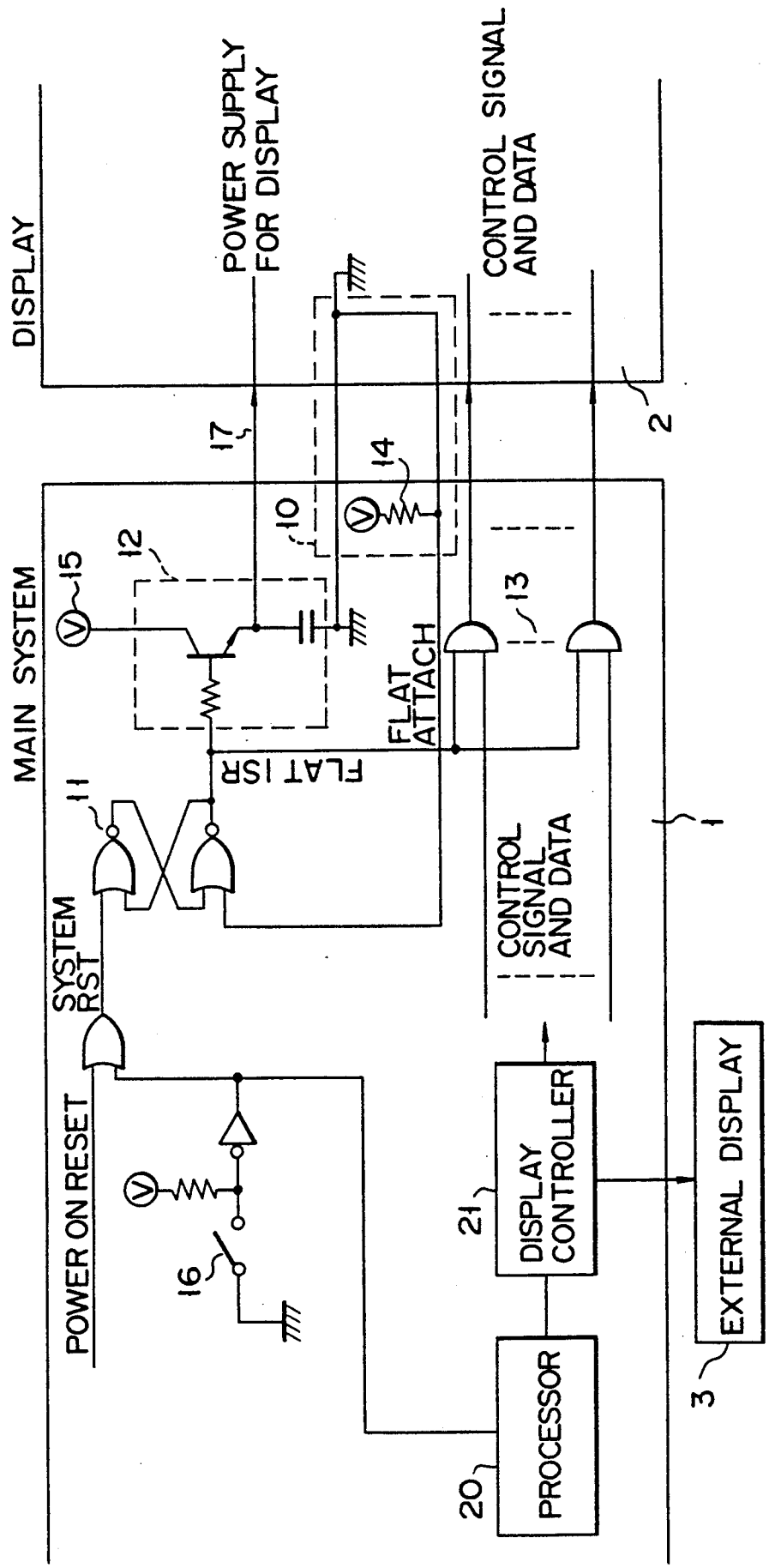
FIG. 2 is a block diagram of a first embodiment of the present invention.

In FIG. 2, which is a block diagram of a first embodiment of the present invention, reference numeral 10 designates a circuit for detecting whether flat panel display 2 is connected to main system 1 or not. When flat panel display 2 is attached or connected to main system 1, a flat panel display connection signal (FLAT ATTACH) is at a low level. Reference numeral 11 designates a flip-flop formed of NOR gates, which serves as a supply instructing circuit for instructing the supply of power and signals to the flat panel display. When a system reset signal (SYSTEM RST) is at a high level and the FLAT ATTACH signal is at a low level, supply instructing circuit 11 renders high a flat panel display instructing signal (FLAT ISR) for instructing the supply of power and signals to flat panel display 2. The system reset signal (SYSTEM RST) may be generated by the logical sum of a POWER ON RESET signal and a reset signal produced by a reset switch 16.

Reference numeral 12 designates a power control circuit for supplying power to the flat panel display when the FLAT ISR signal is at a high level. Reference numeral 13 designates a control circuit formed of AND gates, which is responsive to the FLAT ISR signal to gate control signals and data to be applied to the flat panel display.

Figure 3:
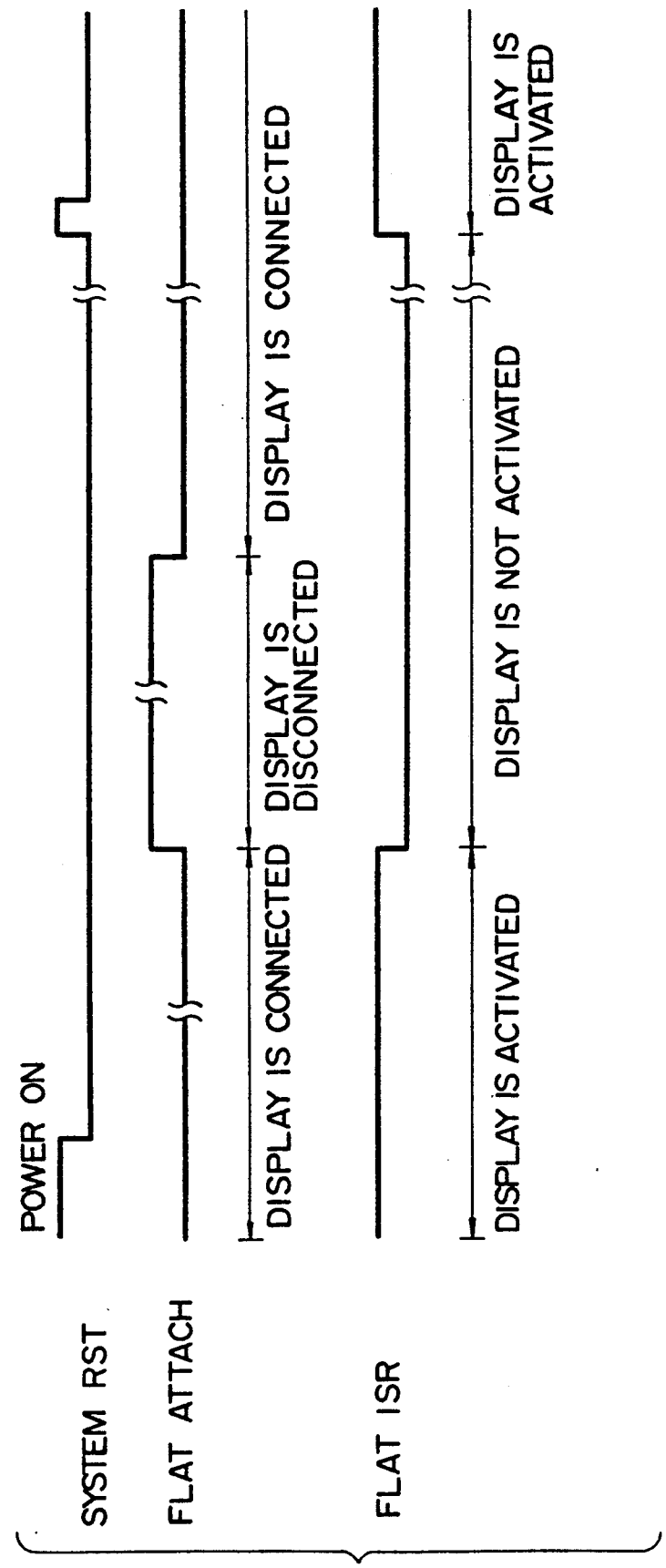
FIG. 3 is a timing diagram which is useful in understanding the operation of the embodiment of the present invention.

FIG. 3 is a timing diagram for illustrating the operation of the embodiment of the present invention. In FIGS. 2 and 3, corresponding signals have the same name and meaning.

The operation of the embodiment of FIG. 2 will be described below in detail with reference to the timing diagram of FIG. 3. When the flat panel display is attached to the main system so that the FLAT ATTACH signal is at a low level, supply instructing circuit 11 generates a FLAT ISR signal at a high level when the POWER ON RESET signal is high or reset switch 16 is turned ON to render the system reset signal (SYSTEM RST) high. As a result, power and signals are applied to the flat panel display so that the display is activated.

When the flat panel display is detached from the main system, on the other hand, the FLAT ATTACH signal goes to a high level. The FLAT ISR signal thus goes to a low level with the result that the flat panel display is not activated because of supply of no power and signals thereto. Even if the flat panel display is attached again at this point, the FLAT ISR signal remains low until the system reset signal (SYSTEM RST) goes high.

When the flat display panel is attached, the FLAT ATTACH signal goes low. The FLAT ISR signal goes high when the SYSTEM RST signal at a high level is applied to supply instructing circuit 11.

In power control circuit 12, a transistor is turned ON by the FLAT ISR signal of high level from supply instructing circuit 11. As a result, power is applied to flat panel display 2. In signal control circuit 13, control signals and data for the flat panel display from a display controller 21 connected to a processor which performs the overall system control, are gated by the AND gates. That is, signal control circuit 13 applies the control signals and data to the flat display panel when the FLAT ISR signal is at a high level.

When, therefore, the flat panel display is being attached, power, control signals and data will never be generated at an interface 17 between main system 1 and display 2 because the FLAT ISR signal is always at a Low level at the time. In other words, the flat panel display can be supplied with power, control signals and data only when the power supply of the main system is turned ON or reset switch 16 is depressed with the flat panel display attached to the main system.

Figure 4:
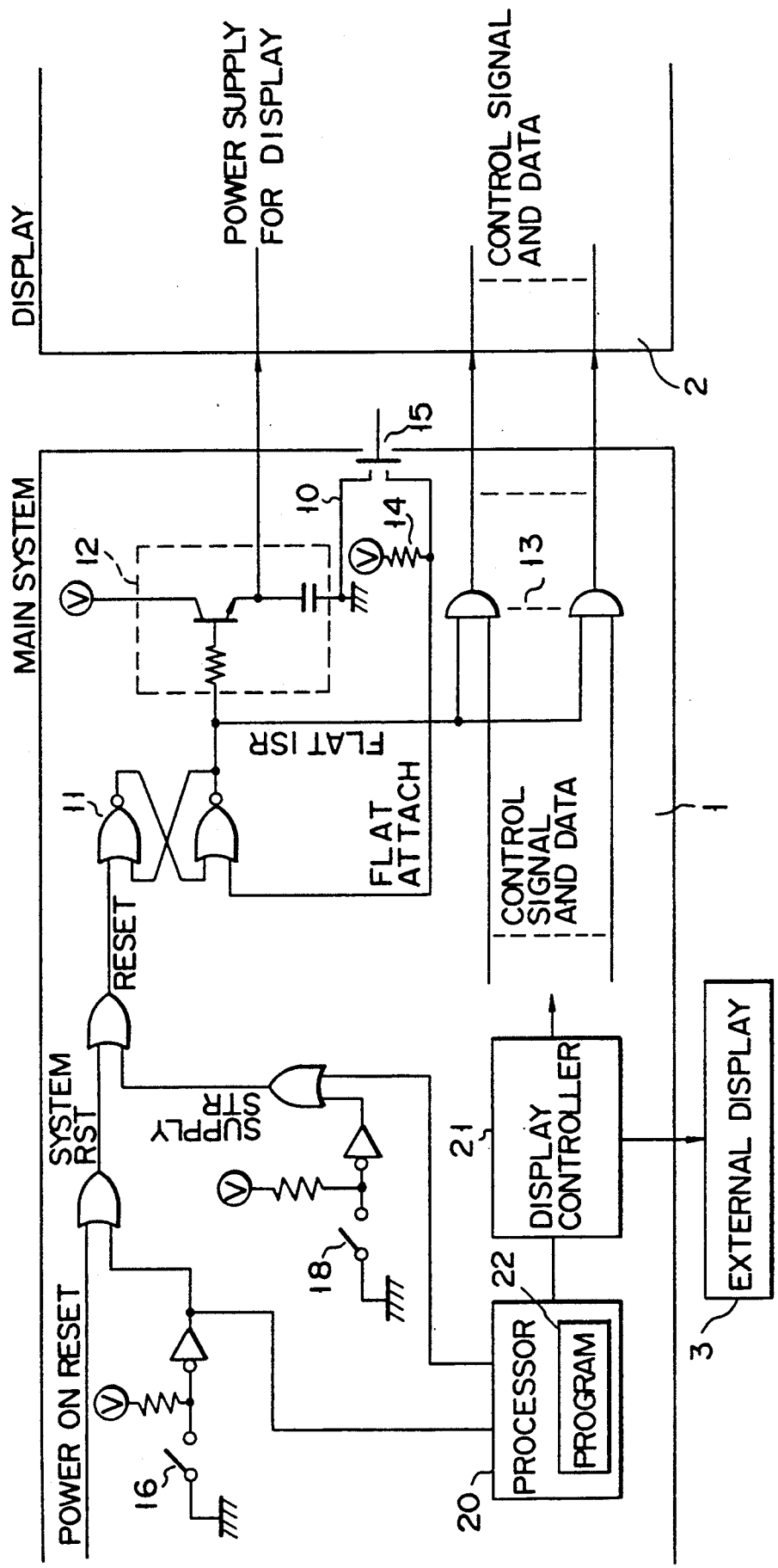
FIG. 4 is a block diagram of a second embodiment of the present invention.

FIG. 4 is a block diagram of a second embodiment of the present invention. In FIG. 4, corresponding parts or signals to those in FIGS. 2 and 3 are named likewise.

In the second embodiment, a reset signal (RESET) is generated by the logical sum of the above system reset signal (SYSTEM RST) and a signal (SUPPLY STR) for starting display on the flat panel display. The SUPPLY STR signal may be generated by a predetermined software program 22 in processor 20 or a switch 18. Owing to this arrangement the flat panel display can be attached to and detached from the main system without destructing a running program in the main system. It will be apparent that this arrangement allows not only a display but also a ROM card to be attached to and detached from a computer system without turning the system power supply OFF.

In the second embodiment, the above connection detecting circuit includes a switch 15 which is switched by the attachment or detachment of flat panel display 2. This switch allows the FLAT ATTACH signal to go high when flat panel display 2 is detached. As a result, the FLAT ISR signal goes to a Low level to disable the supply of power, control signals and data to the flat panel display.

What is claimed is:

1. A device for controlling supply of power and signals from a main system comprising:
   a display which is configured to be connected to and disconnected from said main system;
   detecting means for detecting whether said display is connected to said main system or not;
   supply instructing means responsive to said detecting means, and a reset signal applied thereto, for automatically generating an instruction signal for instructing the supply of power and signals to said display responsive to said reset signal and until said detecting means detects that said display is not connected to said system;
   power control means responsive to the instruction signal for controlling the supply of power to said display to be supplied while said instruction signal instructs said supply of power and signals; and
   signal controlling means, responsive to the instruction signal, for controlling the supply of the signals to said display to be supplied while said instruction signal instructs said supply of power and signals.

2. A device according to claim 1, in which said display is a flat panel display.

3. A device according to claim 2, in which said flat panel display comprises a liquid crystal display.

4. A device according to claim 2, in which said flat panel display comprises a plasma display panel.

5. A device according to claim 1, in which said main system is the main system of a laptop computer.

6. A device according to claim 1, in which said supply instructing means includes a flip-flop circuit.

7. A device according to claim 1, in which said detecting means includes a signal line connecting an input of said supply instructing means to a signal ground of said main system via said display, and a pull-up resistor having one end connected to a power supply of said main system and the other end connected to said input of said supply instructing means.

8. A device according to claim 1, in which said detecting means includes a switch having one end connected to a signal ground of said main system and the other end connected to an end of a pull-up resistor the other end of which is connected to a power supply of said main system, said switch being switched in response to connection or disconnection of said display to and from said main system respectively.

9. A device according to claim 1, in which the reset signal includes a system reset signal.

10. A device according to claim 1, in which the reset signal includes a display start signal for designating a start of display on said display.

11. A device according to claim 10, in which the display start signal is produced by executing a predetermined program in said main system.

12. A device for controlling supply of power and signals from a main system comprising:
   a device which is configured to be connected to and disconnected from said main system;
   detecting means for detecting whether said device is connected to said main system or not;
   supply instructing means responsive to said detecting means and a reset signal applied thereto for automatically generating an instruction signal for instructing the supply of power and signals to said device responsive to said reset signal and until said detecting means detects that said display is not connected to said system;
   power control means responsive to the instruction signal for controlling the supply of power to said device to be supplied while said instruction signal instructs said supply of power and signals; and
   signal controlling means responsive to the instruction signal for controlling the supply of the signals to said device to be supplied while said instruction signal instructs said supply of power and signals.

13. A device according to claim 12, in which said detecting means includes a signal line connecting an input of said supply instructing means to a signal ground of said main system via said display, and a pull-up resistor having one end connected to a power supply of said main system and the other end connected to said input of said supply instructing means.

14. A device according to claim 12, in which said detecting means includes a switch having one end connected to a signal ground of said main system and the other end connected to an end of a pull-up resistor the other end of which is connected to a power supply of said main system, said switch being switched in response to connection or disconnection of said display to and from said main system respectively.

15. A device according to claim 12, in which the reset signal includes a system reset signal.

16. A device according to claim 12, in which the reset signal includes a display start signal for designating a start of operation of said device.

17. A device according to claim 12, in which the operation start signal is produced by executing a predetermined program in said main system.

18. In a computer system which has a main system and is equipped with a first display connectable to and disconnectable from the main system and is further connectable to a second display, a method of controlling supply of power and signals to said first display comprising the steps of:
   detecting whether said first display is connected to said main system or not;
   generating an instruction signal for instructing the supply of power and signals to said first display in response to an output produced by said detecting step and an input reset signal such that said instruction signal automatically instructs the supply responsive to said reset signal and until said detecting means detects that said display is not connected to said system;
   controlling the supply of power to said first display in response to said instruction signal; and
   controlling the supply of signals to said first display in response to the instruction signal.

* * * * *